(12) United States Patent
Jeon

(10) Patent No.: US 6,340,988 B1
(45) Date of Patent: Jan. 22, 2002

(54) METHOD AND APPARATUS FOR DISPLAYING VIDEO DATA FOR TESTING A VIDEO BOARD

(75) Inventor: Young-il Jeon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/071,539

(22) Filed: May 4, 1998

(30) Foreign Application Priority Data

May 2, 1997 (KR) ............................................. 97-16976

(51) Int. Cl.⁷ .......................... H04N 17/00; H04N 3/27
(52) U.S. Cl. ...................... 348/180; 348/189; 348/557
(58) Field of Search ................................. 348/180, 189, 348/540, 542, 543, 554, 556, 557, 558, 569, 570; 345/904; H04N 17/00, 17/02, 3/27, 5/46, 5/50; H03L 7/00

(56) References Cited

U.S. PATENT DOCUMENTS

| 5,124,804 | A | * | 6/1992 | Socarras ...................... 348/552 |
| 5,325,195 | A | * | 6/1994 | Ellis et al. ................... 348/552 |
| 5,432,548 | A | | 7/1995 | Byen et al. .................. 348/180 |
| 5,440,339 | A | | 8/1995 | Harrison et al. ............. 348/189 |
| 5,455,870 | A | | 10/1995 | Sepai et al. .................. 348/126 |
| 5,502,458 | A | * | 3/1996 | Braudaway et al. ......... 345/153 |
| 5,526,043 | A | | 6/1996 | Wen ............................. 348/190 |
| 5,570,108 | A | * | 10/1996 | McLaughlin et al. ....... 345/146 |
| 5,592,233 | A | * | 1/1997 | Kox ............................ 348/552 |
| 5,805,233 | A | * | 9/1998 | West .......................... 348/537 |
| 5,933,197 | A | * | 8/1999 | Kudo .......................... 348/555 |
| 5,978,041 | A | * | 11/1999 | Masudo et al. ............. 348/563 |
| 6,118,429 | A | * | 9/2000 | Kasai et al. ................ 345/132 |

* cited by examiner

Primary Examiner—Reinhard J. Eisenzopf
Assistant Examiner—Brian P. Yenke
(74) Attorney, Agent, or Firm—Robert E. Bushnell, Esq.

(57) ABSTRACT

A method and apparatus for displaying video data for testing a video board of a computer capable of enhancing the test reliability performs the test through an algorithm by normalizing forms of patterns displayed on a screen to test the video board. A resolution of the screen to be displayed thereon is firstly decided, and a screen mode suitable to the screen resolution is set. The total number of dots in horizontal and vertical directions with regard to colors to be displayed on the screen is calculated by using the total number of horizontal and vertical dots according to the decided screen resolution. After that, one color among the various colors is displayed in the horizontal direction and several colors are displayed in turn on the screen, the colors being equally divided by a predetermined number in the vertical direction according to a predetermined order.

24 Claims, 7 Drawing Sheets

METHOD AND APPARATUS FOR DISPLAYING VIDEO DATA FOR TESTING A VIDEO BOARD

CLAIM OF PRIORITY

This application makes reference to, incorporates the same herein, and claims all benefits accruing under 35 U.S.C. §119 from an application for A METHOD OF DISPLAYING A VIDEO DATA FOR TESTING A VIDEO BOARD earlier filed in the Korean Industrial Property Office on the May 2, 1997 and there duly assigned Serial No. 16976/1997.

BACKGROUND OF THE INVENTION

1. Technical Field

The present invention relates to a method and apparatus for displaying video data for testing a video board, and more particularly to a method and apparatus for displaying video data for testing a video board of a computer capable of enhancing the test reliability and performing a test through an algorithm by normalizing forms of patterns displayed on a screen to test the video board.

2. Related Art

Generally, a video board which can display all kinds of information on a monitor is mounted in a computer. Moreover, the following components are also included in the computer (mainly in the rear thereof): a power input/output terminal to/from which power for home use is inputted/outputted; a video port to/from which a video signal is inputted/outputted; an audio port to/from which an audio signal is inputted/outputted; a modem port to which an exclusive line or a general telephone network is connected; a keyboard terminal to which a keyboard is connected; a joy stick terminal to which a joy stick is connected; a mouse terminal to which a mouse is connected; and a cooling fan. The computer body having the above-described structure is connected to the monitor by a video cable, and the image signal which is signal-processed in the video board is transmitted to the monitor, and is then displayed.

Methods for testing whether the video board is operating normally during performance of a process to mount the video board in the computer include a test with the naked eye, and a camera test using a video camera.

In the case of the test with the naked eye, when an operator directly checks and determines the image which is displayed on the monitor, the test result is very subjective and it can be influenced by the physical rhythm of the determiner. Thus, the reliability of the test result is reduced.

To overcome the above-described problem, a testing method using a camera has been introduced. The image is displayed on the monitor through the video board mounted in the computer, and then the image which is displayed on the monitor is photographed by the video camera (usually, a charger-coupled device or CCD). After that, target image information which is photographed is compared with preset reference image information in a tester, and the compared result is displayed/outputted through a monitor or a printer which is separately located.

Nevertheless, current testing methods and apparatus for testing a video board and displaying video data are burdened by several disadvantages. Specifically, for the reasons stated in more detail below, such method and apparatus produce test results which are unreliable. In addition, it has not been possible to produce an economical test apparatus. Furthermore, such method and apparatus employ techniques which consume too much time for testing. Additionally, current methods and apparatus are not effective in establishing a reliable standard for testing.

Therefore, there is a need in the prior art for the development of a method and apparatus for displaying video data for testing a video board through the use of an algorithm, thereby simplifying the test process. There is also a need for the development of a testing apparatus which is economical to manufacture.

The following patents are considered to be representative of the prior art, and are burdened by the disadvantages set forth herein: U.S. Pat. No. 5,526,043 to Wen, entitled Automatic Video Display Testing And Adjusting System, U.S. Pat. No. 5,455,870 to Sepai et al., entitled Apparatus And Method For Inspection Of High Component Density Printed Circuit Board, U.S. Pat. No. 5,440,339 to Harrison et al., entitled System And Method For Testing Intensity Response Of A Medical Monochrome Video Monitor, and U.S. Pat. No. 5,432,548 to Byen et al., entitled Apparatus For Testing And Adjusting Audio Video Signal Waveforns In Color Television.

SUMMARY OF THE INVENTION

Therefore, it is an object of the present invention to perform a test through an algorithm by allowing a target image data displayed on a screen to have a predetermined regularity.

It is another object of the present invention to simplify the test process by providing a normalized target image data and to manufacture a test apparatus having a low price.

Moreover, it is another object of the present invention to easily determine whether a product is a normal one or not, and to control an error limitation.

According to one aspect of the present invention, a method of displaying video data for testing a video board of a computer includes the steps of: deciding a resolution of a screen to be displayed thereon; setting a screen mode suitable to the screen resolution; calculating a total number of dots in the horizontal and vertical directions with regard to colors to be displayed on the screen by using the total number of horizontal and vertical dots according to the screen resolution decided at the step of setting the screen mode; displaying one color among the various colors in the horizontal direction; and displaying several colors in turn on the screen, the colors being equally divided by a predetermined number in the vertical direction according to a predetermined order.

Between the steps of calculating the total number of dots and displaying the colors, it is preferable to include a step of deciding the color which detects an intermediate value of each color from a plurality of colors within a lightness capable of being displayed on the screen and which displays the detected intermediate values of the colors.

Moreover, a plurality of colors can include a red R, a green G and a blue B. In this case, preferably, at the step of deciding the color, the total number of colors capable of being expressed by the red, green and the blue colors is divided into 256 gradations, and intermediate colors regarding each color, as divided into 256 gradations, are selected.

Moreover, a plurality of colors can include the red R, green G, blue B and a classifying color. In this case, preferably, at the step of deciding the color, the total number of colors capable of being expressed by the red, green, blue and the classifying colors is divided into 256 gradations, and intermediate colors regarding the colors, as divided into 256 gradations, are selected.

Preferably, the predetermined display order is as follows: classifying color; one color among the red, green and blue colors; the classifying color; another color among the red, green and blue colors; the classifying color; the other color among the red, green, and blue colors; and the classifying color.

Moreover, a plurality of the colors can include: a red having a lightness lower than a reference lightness, a red having a reference lightness, a red having a lightness higher than the reference lightness, a green having a lightness lower than the reference lightness, a green having a reference lightness, a green having a lightness higher than the reference lightness, a blue having a lightness lower than the reference lightness, a blue having a reference lightness, a blue having a lightness higher than the reference lightness and the classifying color. At the step of deciding the color, the total number of colors capable of being expressed by the red, green, blue and the classifying color are divided into 256 gradations, and colors which are divided into 256 gradations are equally divided into 7. After that, intermediate values of the colors corresponding to $2^{nd}$, $4^{th}$ and $6^{th}$ regions are preferably selected.

Here, the intermediate values of each color are calculated using the following formulas:

the intermediate value of color having a lightness lower than the reference lightness is $$\frac{2C+C+1}{2} = \frac{3C+1}{2},$$

the intermediate value of color having the reference lightness is $$\frac{4C+3C+1}{2} = \frac{7C+1}{2},$$

the intermediate value of color having a lightness higher than the reference lightness is $$\frac{5C+4C+1}{2} = \frac{9C+1}{2},$$

and, C is $$\frac{\text{total number of colors regarding each color}}{7}.$$

Preferably, a predetermined display order is as follows: a classifying color; one color having a low lightness among the red, green and blue colors; the classifying color; another color having a low lightness among the red, green and blue colors; the classifying color; the other color having a low lightness among the red, green and blue colors; the classifying color; one color having the reference lightness among the red, green and blue colors; the classifying color; another color having the reference lightness among the red, green and blue colors; the classifying color; the other color having the reference lightness among the red, green and blue colors; the classifying color; one color having a high lightness among the red, green and blue colors; the classifying color; another color having a high lightness among the red, green and blue colors; the classifying color; the other color having a high lightness among the red, green and blue colors; and the classifying color.

Moreover, the classifying color is preferably a white or a black color.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
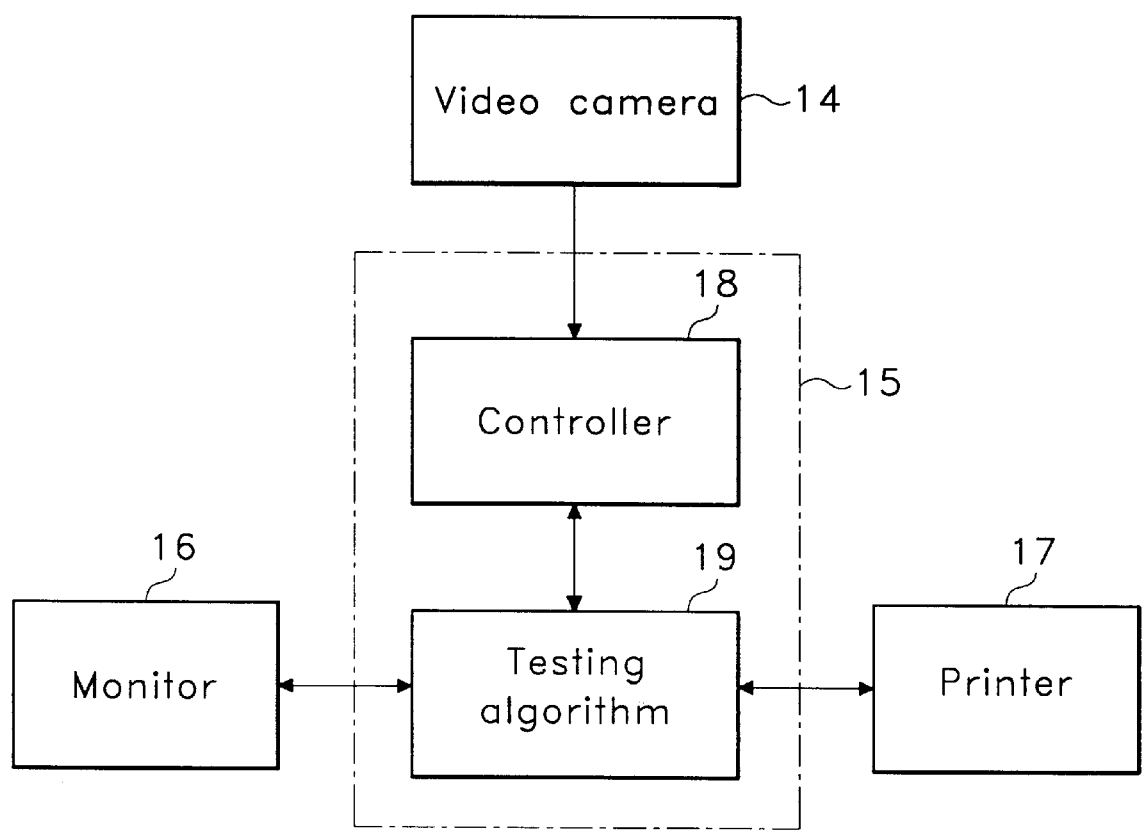
FIG. 1 is a block diagram of an apparatus for testing a video board.

FIG. 1 is a block diagram of an apparatus for testing a video board. As described in FIG. 1, when target image information photographed by video camera 14 is inputted to a tester 15, a controller 18 inside of the tester 15 compares the target image information with the reference image information by substituting the target image information in a test algorithm 19. After that, the compared result is displayed/outputted to the monitor 16 or the printer 17. At this time, the target image information photographed by the video camera 14 is converted to target image data of pixel unit united by R, G and B colors through the controller 18. Then, the converted data is divided into separate colors of R, G and B of dot unit, and they are then compared with the reference image information.

After a specific coordinate (X, Y) on the screen is calculated by using a vertical synchronization signal VSYNC and a horizontal synchronization signal HSYNC which are outputted together with R, G and B signals, the R, G and B data are displayed on the monitor 13. To perform the test with the naked eye with respect to the displayed image, it is not necessary to have any limitation on the video data to be displayed. As a result, any patterns capable of being classified by the eye of a human being have been displayed. For an objective classification regarding the displayed patterns, a type in which various colors are arrayed in a specific form has been adopted The test, which displays any figure on the screen, stores the displayed figure data in a memory, and then compares the stored figure data and the reference data, has the following problems in the case where the data format is not decided.

First, where the figure data to be displayed on the screen is not decided, as there is no yardstick for judgement whether the data which is sampled and read is correct data or not, it is possible to designate a wrong data pattern as the reference data. Accordingly, the reliability for the tested result is lessened.

Second, as the reference data is not decided by a specific pattern, the state of the video board can be determined only by one-to-one comparison of the reference image data and the target image data. As a result, it is not possible to provide an economical test apparatus.

Third, when a plurality of data, which are located at any positions on the screen, is optionally selected, since there is no relation among the selected data, it is necessary to compare the entire screen, and therefore it takes much time for testing.

Finally, to ensure efficiency of the test process, it is necessary to adopt a test method using an algorithm. However, in the case of irregular figures, it is very difficult to realize an algorithm which recognizes the irregular figures, and thus the test method of simple comparison must be relied upon. As a result, it is impossible to manufacture a test apparatus which can control error limitation. For example, in the case where the displayed target image data is moved and displayed by one dot in every direction, such is recognized as a normal state when performing the test with the naked eye, as it is difficult to recognize the movement. However, in the case of using the testing apparatus, it is regarded as an abnormal state, and the video board can be determined to be bad or good based on only a slight difference. As a result, it is inconvenient as a standard for testing.

The preferred embodiments of a method and apparatus for displaying video data for testing a video board according to the present invention will be explained.

First, for realizing test automation by use of a computer, it is necessary to have a testing apparatus which converts a video signal from an analog format into a signal of digital format, and which compares the digital signal with original information.

Figure 2:
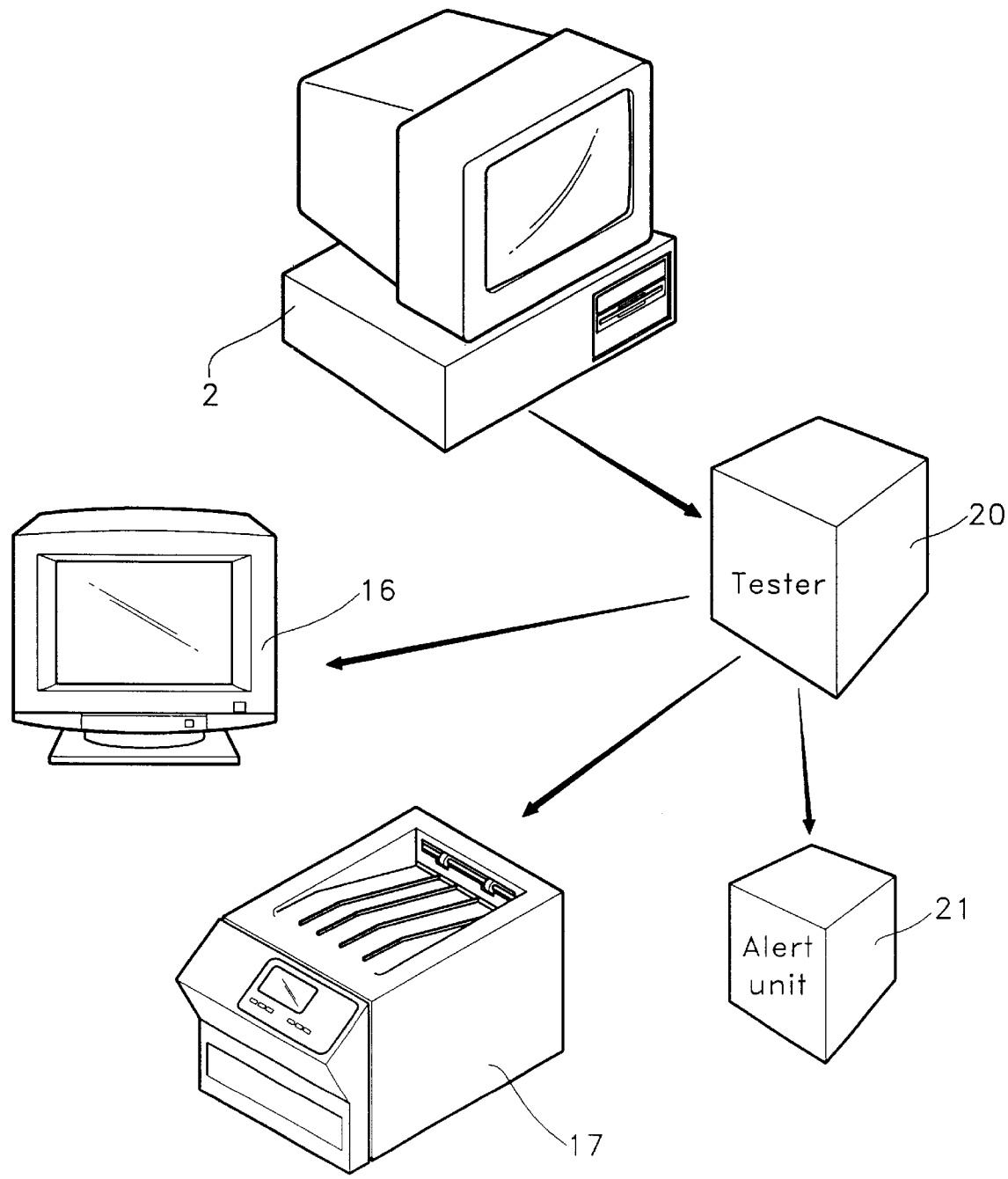
FIG. 2 is a system view illustrating an apparatus for testing a video board according to the present invention.

Referring to FIG. 2, the apparatus for testing the video board includes: a tester 20 which receives a video signal from a computer body 2 in which the video board is included, and which tests whether the video board is in a normal state; a monitor 16 and a printer 17 which are connected to the tester 20, and which display and print test result outputted by the tester 20; and an alert unit 21 which generates an alarm signal so that a user is alerted when the test result generated by the tester 20 indicates that the video board is in an abnormal state.

Figure 3:
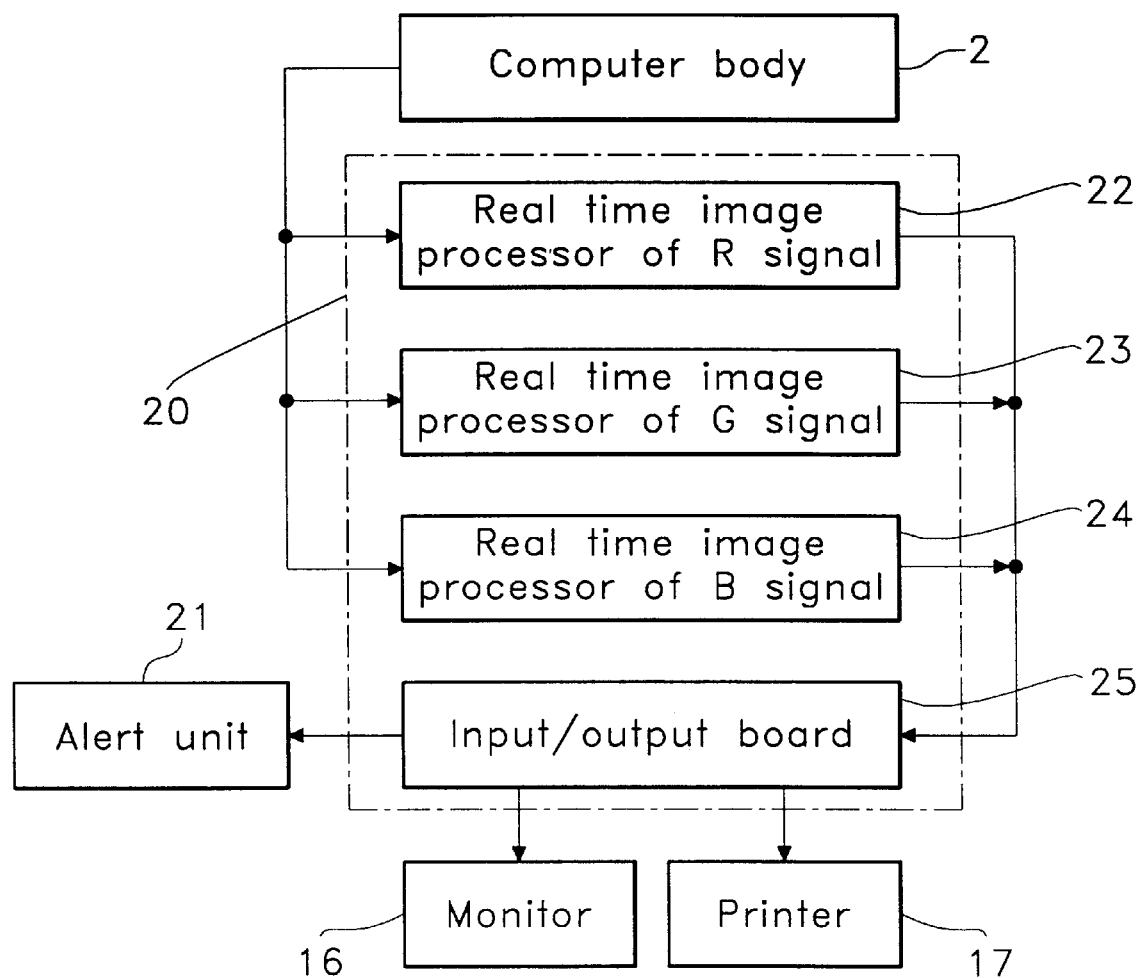
FIG. 3 is a block diagram minutely illustrating the inside of the testing apparatus shown in FIG. 2.

As described in FIG. 3, the tester 20 is designed to perform a separate test process by receiving the video signal transmitted by the computer body 2.

The tester 20 includes: real time image processors 22, 23 and 24 which perform signal-processing to reproduce R, G and B images, respectively, by using synchronization signals and the R, G and B signal inputs, respectively, from a video input/output unit of the computer body 2; and an input/output board 25 which interfaces with external apparatuses so that image data converted by the real time image processors 22, 23 and 24 can be transmitted to various output devices, such as the monitor 16, the printer 17 and the alert unit 21.

Figure 4:
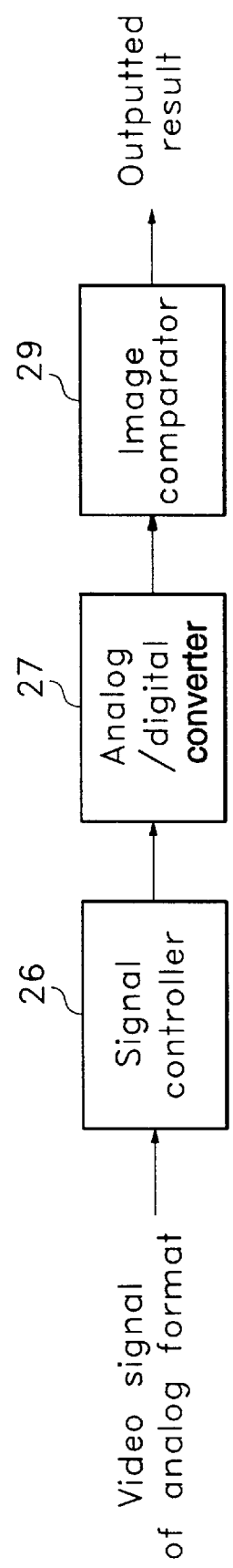
FIG. 4 is a block diagram illustrating the inside of a real time image processor shown in FIG. 3.

Moreover, the real time image processors 22, 23 and 24, as shown in FIG. 4, filter noise included in the analog video signal through a signal controller 26, and convert the signal into 8 bit target image data using an analog/digital converter 27. Comparator 28 then compares the target image data with preset reference image data, and outputs the compared results.

To perform the test process illustrated above, figures having predetermined patterns are displayed on the screen. Here, the figures have standards prescribed as follows.

First, only one color is displayed in one line.

Second, in the case where the testing operation cannot be properly performed in one horizontal synchronization signal by forming one figure with several lines, the operation can be continued in the next horizontal synchronization signal.

Third, to clearly classify the colors, between one pattern indicating one color and the other pattern indicating the other color, the classifying color (such as a white or a black) is inserted.

Fourth, the pattern is evenly displayed over the entire screen so that the test operation can be performed irrespective of the resolution of the screen.

Fifth, to recognize the variation of the lightness of each color, a plurality of patterns formed by the reference color and colors lighter/darker than the reference color is displayed on one screen by being classified.

Sixth, to test all the R, G and B signals simultaneously, the above-referenced patterns are displayed three times per unit of R, G and B.

Figure 5A:
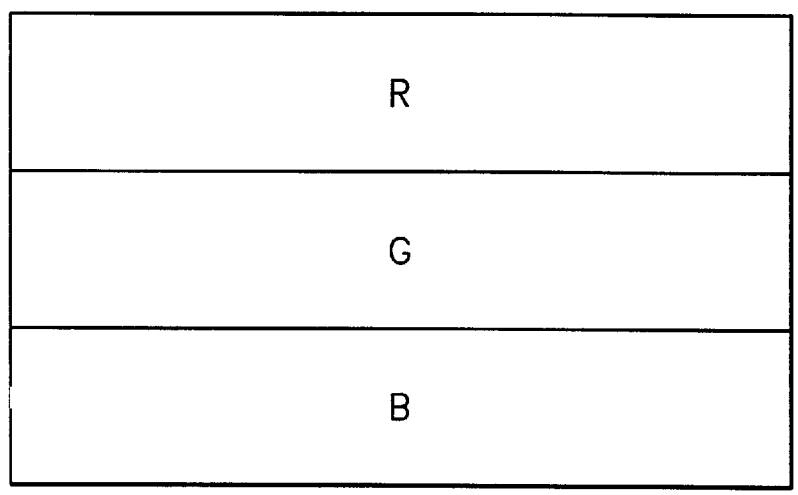
FIGS. 5A to 5C are views illustrating the embodiments of patterns capable of being displayed on the screen by the present invention.
Figure 5B:
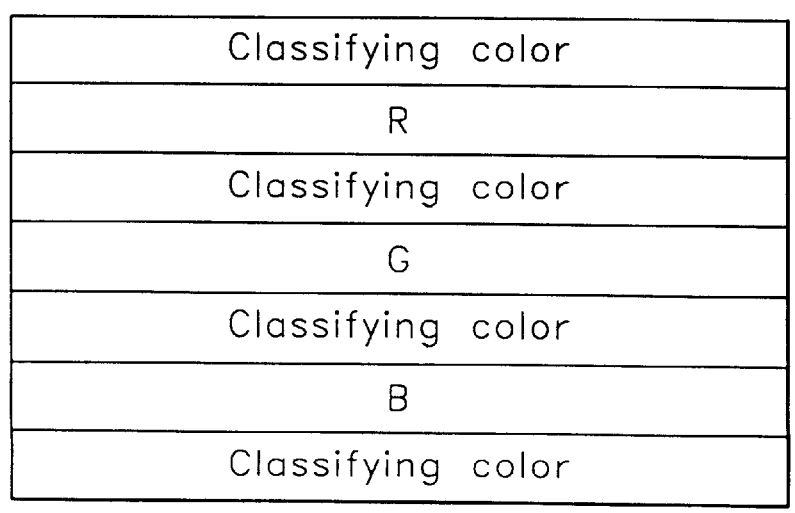
Figure 5C:
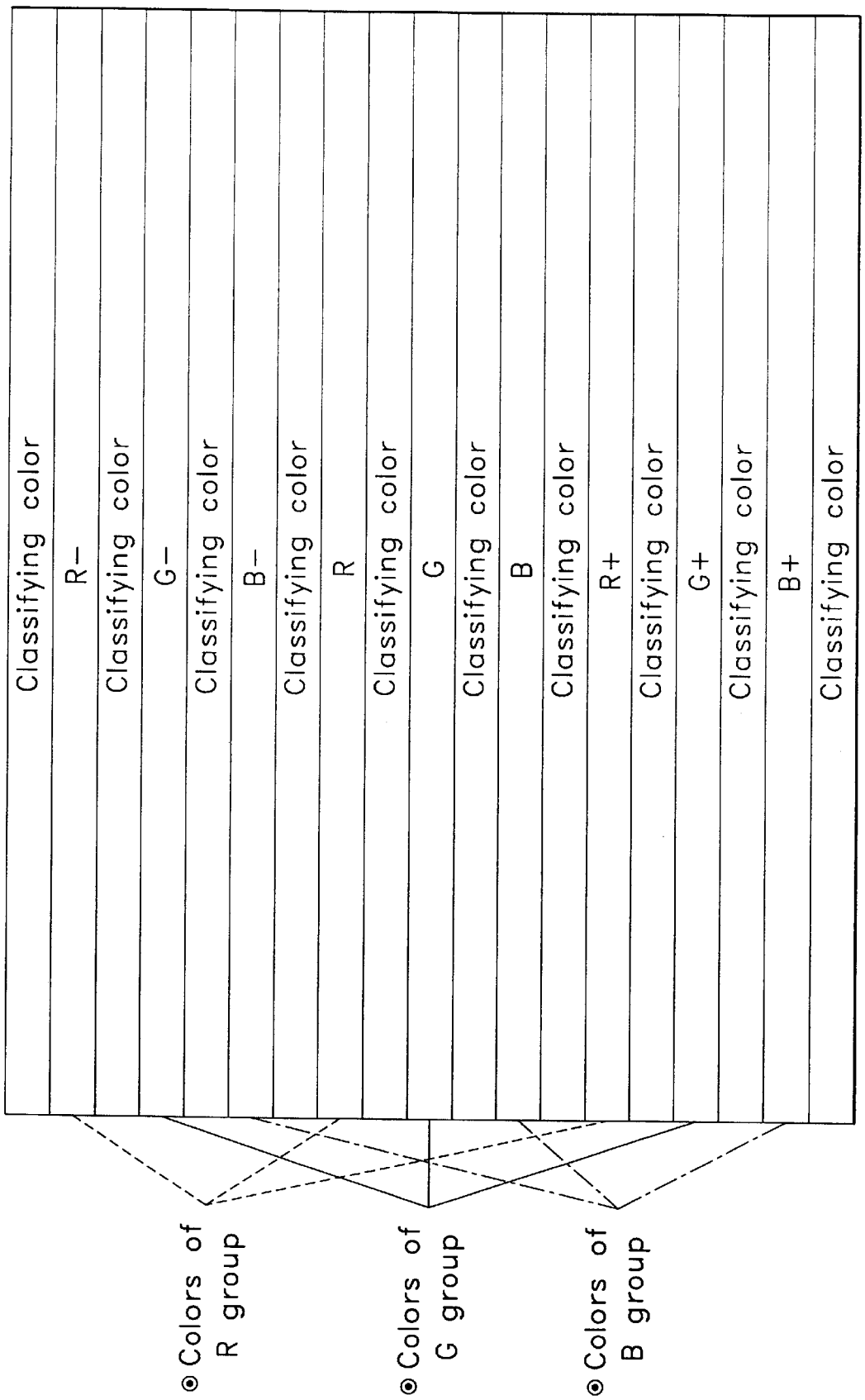

The patterns which can be set by optionally selecting the above prescriptions are illustrated in FIGS. 5A to 5C. Here, FIG. 5A illustrates the most simplified pattern; FIG. 5B illustrates that the classifying color is inserted between each color; and FIG. 5C illustrates that the reference colors, light colors and dark colors are expressed separately, and the classifying color is inserted between each color. FIG. 5C is a most proper pattern capable of being employed in the present invention. Each color is spaced at an identical interval by n dots in the vertical direction.

In the case of colors of R group, R indicates the reference color; R− indicates a color having a lightness lower than the reference color R; and R+ indicates a color having a lightness higher than the reference color R. A total of 256 colors, 32,786 colors, 65,536 colors or 1,048,576 colors are divided into 256 colors, and they are then divided into 7. And then, colors of $2^{nd}$, $4^{th}$ and $6^{th}$ regions are selected. At this time, too light or too dark colors are excluded. To make patterns in the present invention, intermediate color values of $2^{nd}$, $4^{th}$ and $6^{th}$ regions are preferably selected.

Figures 6, 7:
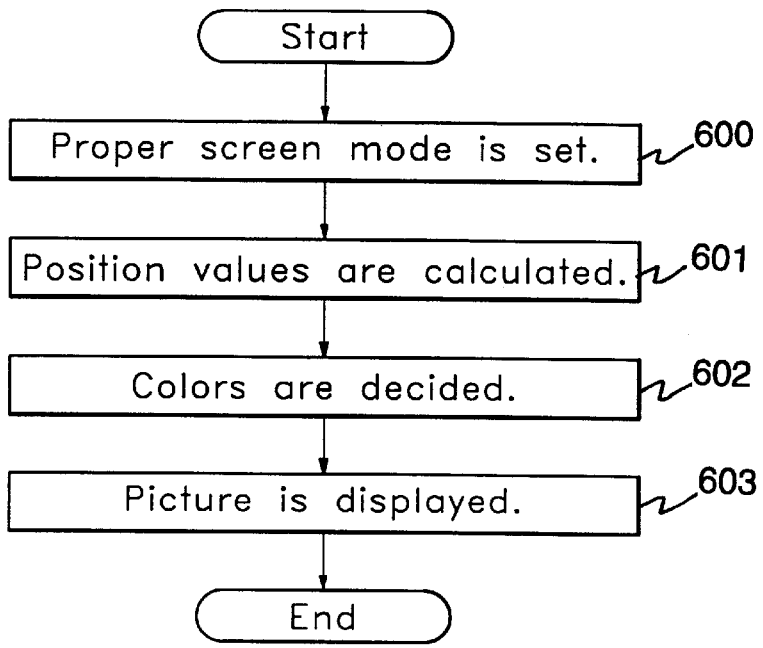
FIG. 6 is a flow chart illustrating a process for displaying the pattern on the screen shown in FIGS. 5A to 5C.
FIG. 7 is a view illustrating a display position at step of displaying shown in FIG. 6.

The process for displaying the patterns is illustrated in FIG. 6.

As shown in the drawing, the screen is first set (block 600). In other words, the screen resolution is decided and a proper screen mode is set.

After that, position values are calculated (block 601). In other words, the numbers of colors of the x-axis and the y-axis, which are displayed on the screen, are obtained by using the total number of the horizontal and vertical dots decided at a step of setting the screen, and the numbers of the x-axis and the y-axis are set as M and N, respectively.

Next, colors are decided (block 602). In other words, intermediate colors of R can be obtained by the following formulas.

$$C_R = \frac{\text{total number of colors of } R}{N}$$

$$R-= \frac{2C_R + C_R + 1}{2} = \frac{3C_R + 1}{2}$$

$$R = \frac{4C_R + 3C_R + 1}{2} = \frac{7C_R + 1}{2}$$

$$R+= \frac{5C_R + 4C_R + 1}{2} = \frac{9C_R + 1}{2}$$

Intermediate values of G−, G and G+, and B−, B and B+ can be obtained in a similar way.

Here, coefficients applied to each color are most properly set to achieve the object of the present invention. In other words, to easily obtain the intermediate colors even in the case where the screen resolution is different, the most proper coefficient which can be applied to various conditions is set. However, this coefficient can be varied without being derived from the central scope of the present invention.

Finally, the picture is displayed (block 603). That is, designated colors are outputted so that any coordinate (X, Y) on the screen is outputted, as shown in FIG. 7. At this time, the colors can be displayed in the order of R, G and B, as shown in FIG. 5A. The colors can be displayed in the order of the classifying color, R, the classifying color, G, the classifying color, B and the classifying color, as shown in FIG. 5B. Also, it is possible to display the colors in the order of the classifying color, R−, the classifying color, G−, the classifying color, B−, the classifying color, R, the classifying color, G, the classifying color, B, the classifying color, R+, the classifying color, G+, the classifying color, B+ and the classifying color, as shown in FIG. 5C.

This means that one color is displayed by n dots in the same direction, and then the other color is displayed by n dots in the vertical direction. That is, in the coordinate (X, Y), by setting X=0 and Y=Y+N, the display operation of the blocks is repeatedly performed. At this time, it is preferable that colors be displayed by M dots in the horizontal direction.

Moreover, the above pattern can be easily changed by those skilled in the art. The classifying color can be set with any colors capable of classifying the R, G and B, in addition to the white and black colors.

As described above, in the case of testing the video board using video data having the above-described patterns, there are several benefits as follows.

First, in the case where the testing apparatus which sets R, G and B colors as input sources is established, the comparison regarding the colors of three groups can be simultaneously treated in a similar way through the same hardware apparatus. Accordingly, as there is no necessity to design a separate program for performing the test process regarding the respective R, G and B colors, the cost and effort of developing software thereof can be saved.

Second, the difference between the color displayed in a specific line and the designated color can be easily checked.

Third, in the case where colors which are degenerated by noise are displayed on the screen, displaying the prescribed pattern is faster and more exact than displaying any patterns, and the changed parts are easily detected.

Fourth, since the target image data of the testing apparatus can be stored by reading the result outputted from the video board and the logically decided colors can be indicated, the chance of error occurring in the production of the target image data to be compared is removed, thereby resulting in a more exact test.

Fifth, since the test is performed based on the intermediate color values even in the various modes for displaying the various colors such as 256, 32,786, 65,536 and 1,048,576, it is possible to test the even colors.

Sixth, since the various color data are tested after being divided into each monochrome data of R, G and B, it is possible to test the united colors through the tester for monochrome, and thereby the testing apparatus can be manufactured at low price.

Seventh, since the data are displayed according to the screen mode irrespective of the lengths of the horizontal axis and vertical axis of the screen, the test is not influenced by the screen resolution.

Eighth, since the colors of dots in one line are all the same, signals of a part can be detected and used, and then the capacity of the memory for storing the detected signals can be reduced, resulting in economy in manufacturing the testing apparatus.

Finally, since the variation of the color displayed on the screen is easily sensed with the naked eye, in the case where the testing apparatus is not in a normal state, it can be easily replaced by a test with the naked eye.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of displaying video data for testing a video board of a computer, comprising the steps of:

deciding a resolution of a screen to be displayed thereon:

setting a screen mode suitable to the screen resolution;

calculating a total number of dots in horizontal and vertical directions regarding colors to be displayed on the screen by using a total number of horizontal and vertical dots according to the screen resolution decided at said step of setting the screen mode; and displaying one color among various colors in the horizontal direction and displaying several colors in turn on the screen, wherein said colors are equally divided by a predetermined number in the vertical direction according to a predetermined order;

said method further comprising the step, between said step of calculating the total number of dots and said step of displaying the colors, of detecting an intermediate value of each color from a plurality of colors within a lightness capable of being displayed on the screen, and displaying the detected intermediate value of said each color.

2. The method of claim 1, wherein said plurality of colors includes a red, a green and a blue.

3. The method of claim 2, wherein said step of detecting the intermediate value of each color includes dividing the total number of colors capable of being expressed by said red, green and blue colors into 256 gradations, and selecting intermediate colors with respect to the colors which are divided into 256 gradations.

4. The method of claim 1, wherein said plurality of colors includes a red, a green, a blue and a classifying color.

5. The method of claim 4, wherein said step of detecting the intermediate value of each color includes dividing the total number of colors capable of being expressed by said red, green and blue colors into 256 gradations, and selecting intermediate colors with respect to the colors which are divided into 256 gradations.

6. The method of claim 5, wherein said predetermined order is as follows: classifying color; one color among said red, green and blue colors; the classifying color; another color among said red, green and blue colors; the classifying color; a further color among said red, green, and blue colors; and the classifying color.

7. The method of claim 4, wherein said classifying color is one of a white and a black.

8. The method of claim 1, wherein said plurality of the colors includes a red having a lightness lower than a reference lightness, a red having a reference lightness, a red having a lightness higher than the reference lightness, a green having a lightness lower than the reference lightness, a green having a reference lightness, a green having a lightness higher than the reference lightness, a blue having a lightness lower than the reference lightness, a blue having a reference lightness, a blue having a lightness higher than the reference lightness and the classifying color.

9. The method of claim 8, wherein said step of detecting the intermediate value of each color includes dividing the total number of colors capable of being expressed by said red, green and blue colors into 256 gradations, and selecting intermediate colors with respect to the colors which are divided into 256 gradations.

10. The method of claim 9, wherein the intermediate values of said colors are calculated by the following formulas:

an intermediate value of color having the lightness lower than the reference lightness is $$\frac{2C+C+1}{2} = \frac{3C+1}{2},$$

an intermediate value of color having the reference lightness is $$\frac{4C+3C+1}{2} = \frac{7C+1}{2},$$

an intermediate value of color having the lightness higher than the reference lightness is $$\frac{5C+4C+1}{2} = \frac{9C+1}{2}$$

and C is $$\frac{\text{total number of colors regarding each color}}{7}.$$

11. The method of claim 9, wherein said predetermined order is as follows: a classifying color; one color having a low lightness among said red, green and blue colors; the classifying color; another color having a low lightness among said red, green and blue colors; the classifying color; a further color having a low lightness among said red, green and blue colors; the classifying color; said one color having the reference lightness among said red, green and blue colors; the classifying color; said another color having the reference lightness among said red, green and blue colors; the classifying color; said further color having the reference lightness among said red, green and blue colors; the classifying color; said one color having a high lightness among said red, green and blue colors; the classifying color; said another color having a high lightness among said red, green and blue colors; the classifying color; said further color having a high lightness among said red, green and blue colors; and the classifying color.

12. The method of claim 11, wherein said classifying color is one of a white and a black.

13. An apparatus for displaying video data for testing a video board of a computer, comprising:

deciding means for deciding a resolution of a screen to be displayed thereon;

setting means for setting a screen mode suitable to the screen resolution;

calculating means for calculating a total number of dots in horizontal and vertical directions regarding colors to be displayed on the screen by using a total number of horizontal and vertical dots according to the screen resolution decided at said step of setting the screen mode;

displaying means for displaying one color among various colors in the horizontal direction and displaying several colors in turn on the screen, wherein said colors are equally divided by a predetermined number in the vertical direction according to a predetermined order; and detecting means for detecting an intermediate value of each color from a plurality of colors within a lightness capable of being displayed on the screen, and wherein said displaying means displays the detected intermediate values of the colors.

14. The apparatus of claim 13, wherein said plurality of colors includes a red, a green and a blue.

15. The apparatus of claim 14, wherein said detecting means divides the total number of colors capable of being expressed by said red, green and blue colors into 256 gradations, and selects intermediate colors with respect to the colors which are divided into 256 gradations.

16. The apparatus of claim 13, wherein said plurality of colors includes a red, a green, a blue and a classifying color.

17. The apparatus of claim 16, wherein said detecting means divides the total number of colors capable of being expressed by said red, green and blue colors into 256 gradations, and selects intermediate colors with respect to the colors which are divided into 256 gradations.

18. The apparatus of claim 17, wherein said predetermined order is as follows: classifying color; one color among said red, green and blue colors; the classifying color; another color among said red, green and blue colors; the classifying color; a further color among said red, green, and blue colors; and the classifying color.

19. The apparatus of claim 16, wherein said classifying color is one of a white and a black.

20. The apparatus of claim 13, wherein said plurality of the colors includes a red having a lightness lower than a reference lightness, a red having a reference lightness, a red having a lightness higher than the reference lightness, a green having a lightness lower than the reference lightness, a green having a reference lightness, a green having a lightness higher than the reference lightness, a blue having a lightness lower than the reference lightness, a blue having a reference lightness, a blue having a lightness higher than the reference lightness and the classifying color.

21. The apparatus of claim 20, wherein said detecting means divides the total number of colors capable of being expressed by said red, green and blue colors into 256 gradations, and selects intermediate colors with respect to the colors which are divided into 256 gradations.

22. The apparatus of claim 21, wherein the intermediate values of said colors are calculated by the following formulas:

an intermediate value of color having the lightness lower than the reference lightness is $$\frac{2C+C+1}{2} = \frac{3C+1}{2},$$

an intermediate value of color having the reference lightness is $$\frac{4C+3C+1}{2} = \frac{7C+1}{2},$$

an intermediate value of color having the lightness higher than the reference lightness is $$\frac{5C+4C+1}{2} = \frac{9C+1}{2}$$

and C is $$\frac{\text{total number of colors regarding each color}}{7}.$$

23. The apparatus of claim 21, wherein said predetermined order is as follows: a classifying color; one color having a low lightness among said red, green and blue colors; the classifying color; another color having a low lightness among said red, green and blue colors; the classifying color; a further color having a low lightness among said red, green and blue colors; the classifying color; said one color having the reference lightness among said red, green and blue colors; the classifying color; said another color having the reference lightness among said red, green and blue colors; the classifying color; said further color having the reference lightness among said red, green and blue colors; the classifying color; said one color having a high lightness among said red, green and blue colors; the classifying color; said another color having a high lightness among said red, green and blue colors; the classifying color; said further color having a high lightness among said red, green and blue colors; and the classifying color.

24. The apparatus of claim 23, wherein said classifying color is one of a white and a black.

* * * * *